(12) United States Patent
Culliss

(10) Patent No.: US 7,054,419 B2
(45) Date of Patent: May 30, 2006

(54) ANSWERING MACHINE DETECTION FOR VOICE MESSAGE DELIVERY METHOD AND SYSTEM

(75) Inventor: Gary Culliss, Hampton, NH (US)

(73) Assignee: Soundbite Communications, Inc., Burlington, MA (US)

( * ) Notice: Subject to any disclaimer, the term of this patent is extended or adjusted under 35 U.S.C. 154(b) by 0 days.

(21) Appl. No.: 09/839,840

(22) Filed: Apr. 23, 2001

(65) Prior Publication Data

US 2002/0085686 A1    Jul. 4, 2002

Related U.S. Application Data

(63) Continuation-in-part of application No. 09/751,931, filed on Jan. 2, 2001.

(51) Int. Cl.
*H04M 1/64* (2006.01)

(52) U.S. Cl. ............... 379/88.22; 379/67.1; 379/69; 379/70; 379/88.01; 379/88.02; 379/88.03; 379/88.04; 379/88.12; 379/88.17; 379/88.18; 379/88.19; 379/88.25

(58) Field of Classification Search ............ 379/67.1, 379/70, 88.01, 88.02, 88.03, 88.04, 88.12, 379/88.17, 88.18, 88.19, 88.22, 88.25, 69, 379/201.01, 203.01, 209.01, 218.01, 214.01, 379/67

See application file for complete search history.

(56) References Cited

U.S. PATENT DOCUMENTS

| 4,625,081 | A   |   | 11/1986 | Lotito et al. ............. 379/88.26 |
| 4,757,525 | A   |   | 7/1988  | Matthews et al. ........ 379/88.26 |
| 4,941,168 | A   | * | 7/1990  | Kelly, Jr. ..................... 379/69 |
| 4,972,461 | A   | * | 11/1990 | Brown et al. ................. 379/67 |
| 5,333,180 | A   |   | 7/1994  | Brown et al. ............ 379/88.06 |
| 5,371,787 | A   | * | 12/1994 | Hamilton .................... 379/386 |
| 5,430,792 | A   | * | 7/1995  | Jesurum et al. ............... 379/67 |
| 5,638,424 | A   | * | 6/1997  | Denio et al. .................. 379/67 |
| 5,652,789 | A   |   | 7/1997  | Miner et al. ........... 379/201.01 |
| 5,724,420 | A   | * | 3/1998  | Torgrim ..................... 379/372 |
| 5,764,732 | A   |   | 6/1998  | Lubachevsky ........... 379/88.12 |
| 5,822,405 | A   | * | 10/1998 | Astarabadi ................... 379/88 |
| 5,903,627 | A   |   | 5/1999  | Shaffer et al. ............. 379/67.1 |
| 6,097,791 | A   |   | 8/2000  | Ladd et al. ............. 379/88.19 |
| 6,169,786 | B1  | * | 1/2001  | Dunn et al. ............. 379/88.25 |
| 6,181,779 | B1  | * | 1/2001  | Hwang ..................... 379/67.1 |
| 6,195,417 | B1  | * | 2/2001  | Dans ......................... 379/67.1 |
| 6,215,858 | B1  |   | 4/2001  | Bartholomew et al. .. 379/88.17 |

(Continued)

OTHER PUBLICATIONS

Hoosain, Allan, Office Action, U.S. Appl. No. 09/751,931, mailed on Apr. 14, 2003, 9 pgs.

(Continued)

*Primary Examiner*—Allan Hoosain
(74) *Attorney, Agent, or Firm*—Mintz,Levin,Cohn,Ferris, Glovsky and Popeo, P.C.; A. Jason Mirabito, Esq.; Alison L. McCarthy, Esq.

(57) ABSTRACT

An apparatus and method for detecting an answering machine for a new voice message delivery method and system. The invention detects the presence of an existing answering machine or voicemail system of a Recipient by listening for talk-over during playback of the message or initial prompts. The method and system will also restart playback of the prompts and/or message if talk-over is detected to ensure that the message is properly recorded on the answering machine.

9 Claims, 5 Drawing Sheets

U.S. PATENT DOCUMENTS

| | | | |
|---|---|---|---|
| 6,226,360 B1 * | 5/2001 | Goldberg et al. | 379/69 |
| 6,233,319 B1 * | 5/2001 | Cox et al. | 379/88.22 |
| 6,269,151 B1 * | 7/2001 | Hanson | 379/69 |
| 6,285,745 B1 * | 9/2001 | Bartholomew et al. | 379/88.17 |
| 6,351,522 B1 | 2/2002 | Vitikainen | 379/67.1 |
| 6,396,920 B1 * | 5/2002 | Cox et al. | 379/266.02 |
| 6,424,702 B1 | 7/2002 | Blumenschein et al. | 379/67.1 |
| 6,782,358 B1 * | 8/2004 | Cox et al. | 704/210 |

OTHER PUBLICATIONS

Hoosain, Allan, Office Action, U.S. Appl. No. 09/751,931, mailed on Oct. 23, 2003, 10 pgs.

Hoosain, Allan, Office Action, U.S. Appl. No. 10/051,453, mailed on Apr. 2, 2003, 10 pgs.

Hoosain, Allan, Office Action, U.S. Appl. No. 10/051,453, mailed on Oct. 22, 2003, 11 pgs.

* cited by examiner

ANSWERING MACHINE DETECTION FOR VOICE MESSAGE DELIVERY METHOD AND SYSTEM

RELATED APPLICATIONS

The present application is a continuation-in-part of co-pending patent application Ser. No. 09/751,931, filed Jan. 2, 2001 and entitled "Voice Message Delivery Method and System," which is incorporated herein by reference.

BACKGROUND OF THE INVENTION

1. Field of the Invention

The present invention relates to telecommunications, and more particularly pertains to a method and apparatus for sending recorded telephonic messages, and for enabling the automated recording of the messages on an answering machine or voicemail system.

2. Description of the Prior Art

As described in the co-pending patent application entitled "Voice Message Delivery Method and System," voice messaging systems are known and used for sending and receiving messages between users that are Subscribers of the system. These prior art voice messaging systems require that a Subscriber dial into the system to (1) check to see if there are any messages in the voice mailbox, and (2) listen to the messages. These systems are not widely used among residential customers because many residential customers already use existing stand-alone answering machines and have no need or interest in maintaining a separate voice mailbox. In addition, a sender of a message cannot be sure when the Subscriber will (1) notice that a new message is present within his voice mailbox, and (2) listen to the message. Only when the Subscriber has completed both of these steps will the Subscriber receive the Sender's information.

Because of these and other limitations, the utility of existing voice messaging systems is quite low. As such, it can be appreciated that further improvements are needed in such a system.

SUMMARY OF THE INVENTION

Accordingly, it is an object of the present invention to provide answering machine detection for a new voice messaging delivery method and system in which a recorded message can be automatically recorded into an existing answering machine or voicemail system of a Recipient.

It is another object of the present invention to provide answering machine detection for a new voice messaging delivery method and system that detects the presence of an answering machine or voicemail system upon the line pick-up of an outbound telephone call made by the voice messaging delivery method and system from either a Sender to a Recipient or from a Recipient back to a Sender.

It is another object of the present invention to provide answering machine detection for a new voice messaging delivery method and system that detects the presence of an answering machine or voicemail system prior to a point in time when the answering machine or voicemail system generates a beep tone to signal the start of a recording session.

It is another object of the present invention to provide answering machine detection for a new voice messaging delivery method and system that detects the presence of an answering machine or voicemail system before the end of a recorded greeting played by the existing answering machine or voicemail system.

It is another object of the present invention to provide answering machine detection for a new voice messaging delivery method and system that detects the presence of an answering machine or voicemail system by detecting speech energy from the recipient telephone line during the playing of prompts by the voice messaging delivery method and system.

It is another object of the present invention to provide answering machine detection for a new voice messaging delivery method and system that cleanly records the voice message and/or introductory prompts on the existing answering machine without cropping the prompts or voice message and without an unnatural amount of silence at the beginning of the recording session.

It is another object of the present invention to provide answering machine detection for a new voice messaging delivery method and system that detects whether the line pick-up is by an existing answering machine or live Recipient without an unnatural amount of silence at the beginning of call which would cause a live Recipient to believe that the call was a telemarketing call placed with a predictive dialer.

This brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the method set forth in the following description. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other methods and systems for carrying out the objects and purposes of the present invention. It is important, therefore, that the claims be regarded as including such equivalent constructions insofar as they do not depart from the spirit and scope of the present invention.

DESCRIPTION OF THE PREFERRED EMBODIMENTS

As described in co-pending patent application entitled "Voice Message Delivery Method and System," which is incorporated herein by reference, the present invention is an answering machine detection method and system for use in a voice message delivery method and system. By answering machine is meant stand-alone answering machines that consumers purchase and install on their phone lines, voice-mail systems provided by telephone carriers, voicemail systems provided by third-party vendors that are typically installed in company phone systems, and any other device or method for recording a received call that is not part of the voice messaging system. An existing answering machine may be additionally or alternatively defined as any device or system for answering the telephone to record a message that is not part of the TMS 100 and/or that does not communicate with the TMS through a predefined protocol other than the recording beep or pre-recorded human voice greeting recorded on the answering machine and intended to be interpreted and understood by other human beings calling into the existing answering machine.

Figure 1:
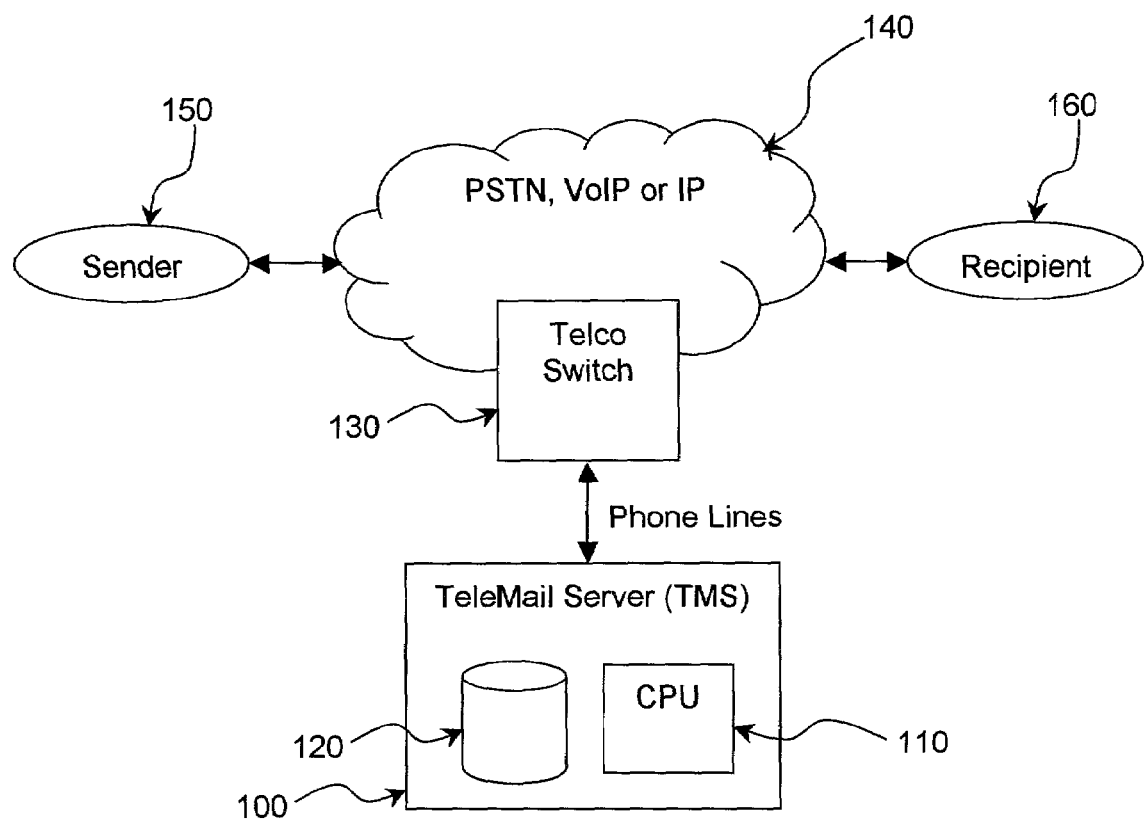
FIG. 1 shows a block diagram of the apparatus of the present invention.

As shown in FIG. 1, the voice messaging method and system of the present invention utilizes a TeleMail™ Server 100 ("TMS"), which includes a CPU 110 and data storage 120. The TMS 100 is connected to a conventionally-known telecommunications switch 130 by phone lines. The switch 130 is connected to a PSTN or VoIP cloud 140 in a manner known to those skilled in the art. Through these connections, a Sender 150 is able to dial a telephone and connect through the cloud 140 and switch 130 to the TMS 100. Similarly, a Recipient 160 can be connected via a telephone with the TMS 100. By telephone is meant any wireless or wireline device that communicates with the cloud 140 through audio and/or video means. The connections shown in FIG. 1 are exemplary only and there are other means for connecting the Sender or Recipient with the TMS that will be apparent to those skilled in the art. The TMS 100 of the present invention is preferably a computer telephony server, such as an Intel PC containing a conventionally-known computer telephony interface board and software that allows the server to be connected to a telephone line and to place and handle inbound and outbound calls.

Figure 2:
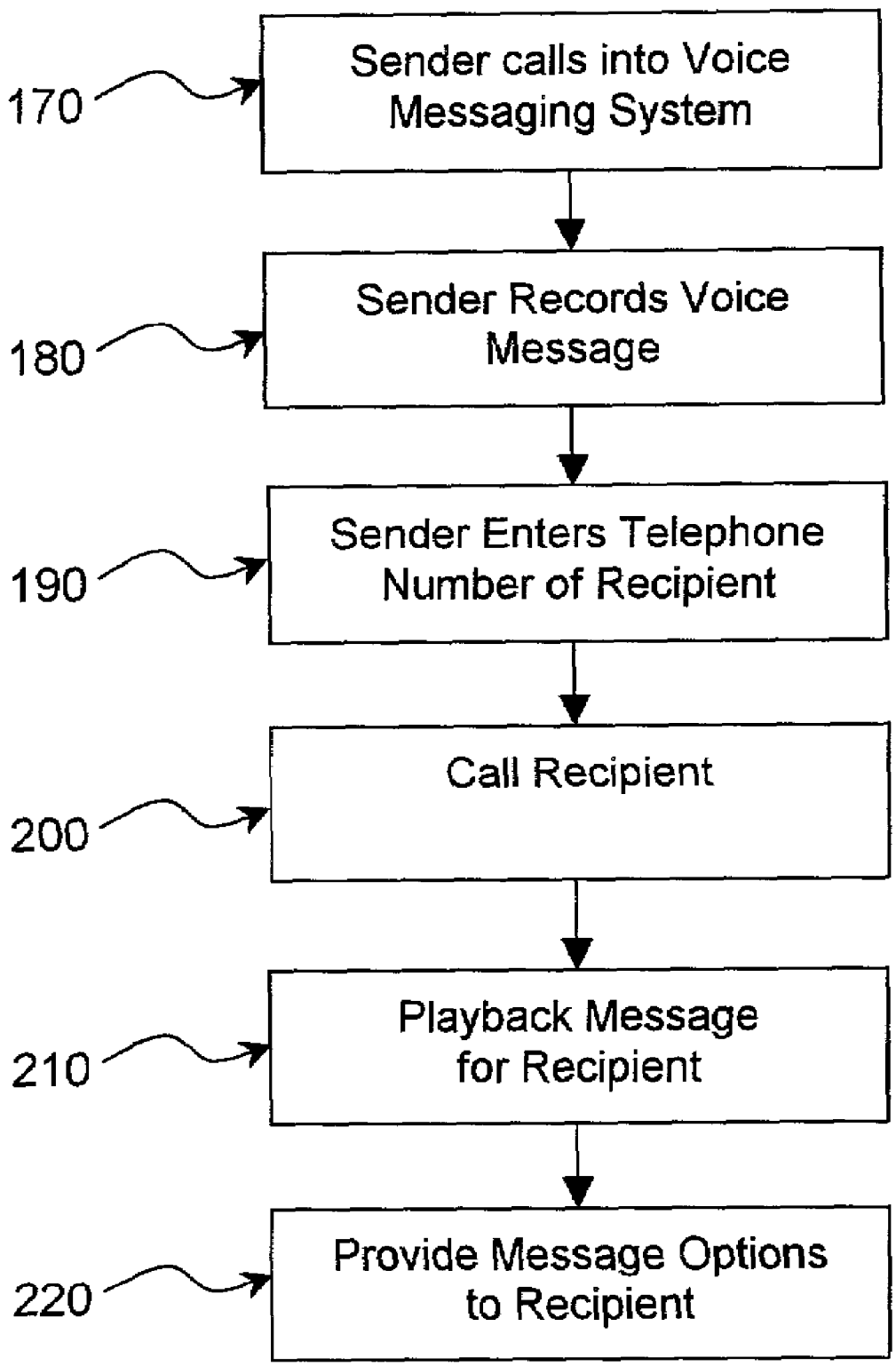
FIG. 2 shows a call flow overview illustrating the operation of the present invention.

FIG. 2 illustrates a call flow showing a function of the present invention. In use, a Sender 150 connects with the TMS, such as by dialing a telephone to place an inbound call into the TMS 100, as shown at step 170. The TMS 100 answers the call and, preferably without requiring that the Sender 150 be a Subscriber to any service, permits the Sender to record a voice message at step 180. Either before or after recording the message at step 170, the TMS 100 then prompts the Sender 150 to enter the telephone number of the Recipient 160 at step 190. The TMS 100 then places an outbound call to the Recipient 160, preferably without requiring that the Recipient be a Subscriber to any service, at step 200 to deliver the recorded message.

In delivering the message at step 200, the TMS 100 will handle a variety of situations. If the Recipient's phone is busy or there is otherwise no answer, the system will hang up and call back at a later time for a predetermined number of attempts. If, after reaching the predetermined number of attempts, the TMS 100 continues to encounter a busy signal or no answer by the Recipient 160, the TMS will return the message back to the Sender 150 by placing a call to the Sender's telephone number, alerting the Sender that the message was not delivered, and allowing the Sender to specify that the TMS 100 continue attempting to reach the Recipient 160 at the same number and/or allow the Sender to enter a different telephone number for either the same or a new Recipient. Upon notifying the Sender 150 of the failed attempt to deliver the message, the TMS 100 may also playback the message for the Sender 150 or allow the Sender to record a new message for addition to, or substitution with, the original message.

When the Recipient's phone is answered, the TMS 100 determines if the phone is answered by a person or an existing answering machine. If the phone is answered by an existing answering machine, the TMS 100 will wait for the recording session in the answering machine to begin, and play the message at step 210 into the existing answering machine for recording therein. If the Recipient 160 answers the phone, the TMS 100 will play the message for the Recipient at step 210. After playback of the message for the Recipient 160, the TMS 100 will offer the Recipient several interactive message options at step 220, including but not limited to, hearing the message again, replying to the message, forwarding the message and saving the message.

Figure 3:
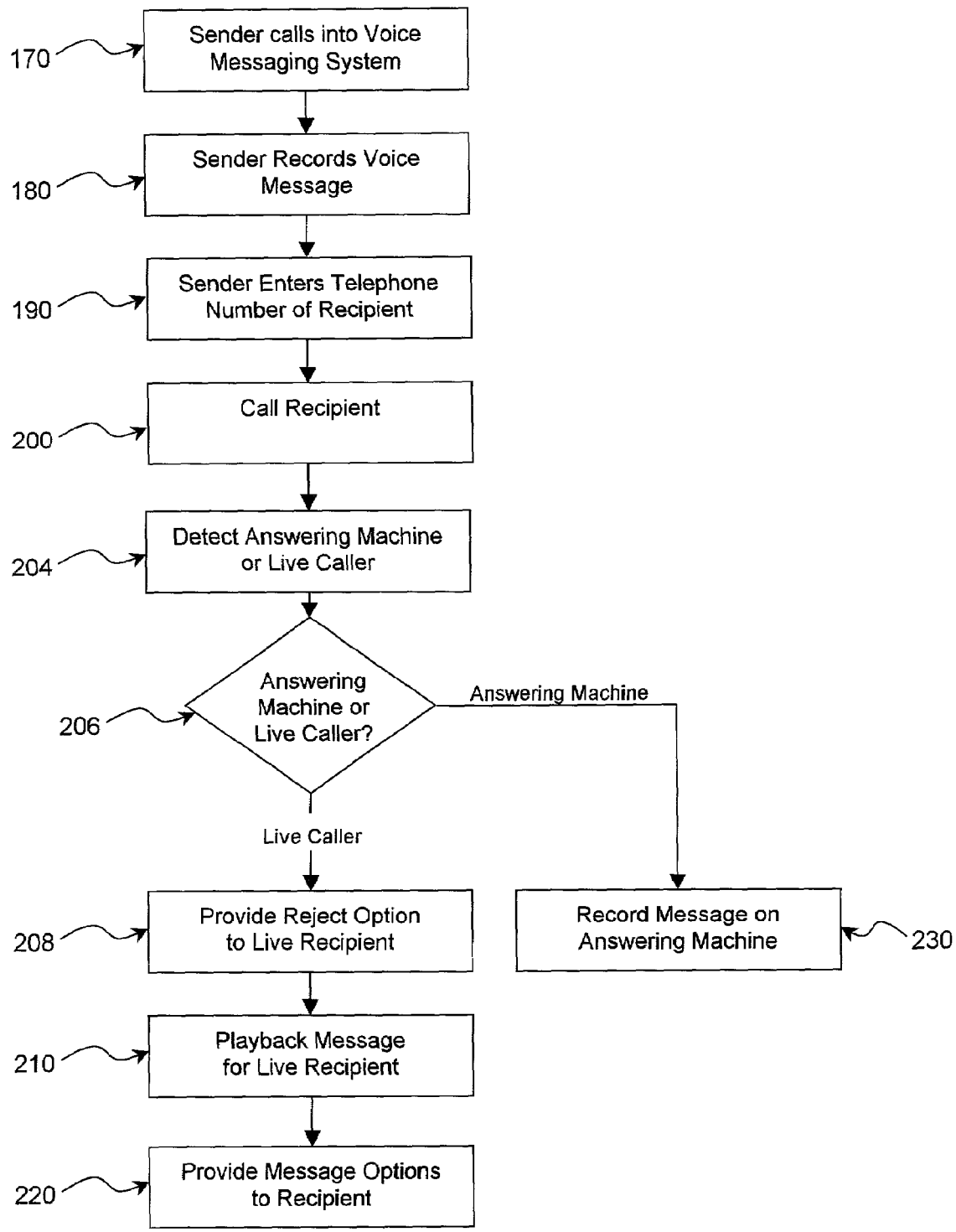
FIG. 3 shows a detailed flow chart illustrating an operation of the present invention.

FIG. 3 illustrates the call flow of the present invention for detecting the presence of an answering machine and for recording a message onto the answering machine. After the TMS 100 calls the Recipient 160 at step 200, the system detects at step 204 whether the line pick-up was by the Recipient 160 or by an answering machine. If the TMS 100 determines that the line pick-up was by a live Recipient 160, then the TMS 100 branches at step 206 to play the message for the Recipient 160 at step 210 and the interactive message options at step 220. Additionally or alternatively, the TMS 100, once it is determined that a live Recipient 160 is on the line, can also play interactive message reject options at step 208, which allows the Recipient to reject the message through an additional rejection menu.

The interactive message reject options at step 208 preferably allow the Recipient to select from a number of options, activated either by touch-tone or voice, that allow the Recipient to manage the message, such as by placing the message delivery on hold where the TMS 100 loops through a prompt for a pre-determined amount of time until the TMS hears a touch-tone or voice input from the user. In the case of placing the message delivery on hold, the TMS 100 could play a prompt that says, for example, that the system is holding the line and request a specific or any touch-tone or voice input to activate playback of the message. The reject options at step 208 may also allow the Recipient to have the message sent back for saving, in which case the TMS would disconnect the line and initiate delivery of the message again through a separate call. Preferably prior to this action, the Recipient 160 is instructed that the system will call back and asked not to answer their phone so that the message will be delivered into their answering machine or voicemail system according to the present invention. The reject options at step 208 may also allow the Recipient 160 to "block" the Sender 150 by adding the phone number of the Sender to a list of numbers correlated to the Recipient's phone number. The TMS 100 maintains these correlated numbers in the data storage 120, whereby future messages from that Sender's phone number are not be delivered to the Recipient. Preferably, the Sender 150 would not know that such messages were not being delivered to prevent the Sender from sending messages from a different number to avoid the block. Additionally or alternatively, the reject options at step 208 could also allow the Recipient 160 to "block all messages" by adding the Recipient's phone number to the data storage 120 of the TMS 100 and specifying that no messages be delivered to the Recipient's phone number, regardless of who they are from. In the case of such a block on all messages, it is preferable to notify the Sender 150 that the message is unable to be delivered to the Recipient 160 and suggest that the Sender try another communications means, such as a traditional phone call, to contact the Recipient.

Both the reject options at step 208 and the message options at step 220 are interactive. By interactive is meant any menu options that request a response from a Recipient (or, in the case of a reply message or call back, a Sender), such as touch-tones or speech input. It is preferable that the TMS 100 not play such interactive options when the line pick-up is by an answering machine. This is because the interactive options would then be recorded onto the answering machine, where they will be played back for the user at a later time when they are no longer active. In the case where interactive options are recorded on an answering machine, a user interacting with the options could unintentionally direct the answering machine to perform a function, such as deleting the message, that was unintended by the user. These false interactive options can also cause disappointment and confusion to the user.

As such, when the TMS 100 detects at step 204 that the line pick-up is an answering machine, the TMS branches at step 206 to step 230 to record the message on the Recipient's answering machine and preferably does not play the interactive reject options at step 208 or the interactive message options at step 220. The message left on the answering machine by the TMS 100 could be the same for both a live Recipient 160 and an answering machine. It is also possible for the message to be different for the live Recipient 160 and the answering machine, wherein the Sender 150 records two messages during sending at step 180.

Figure 4:
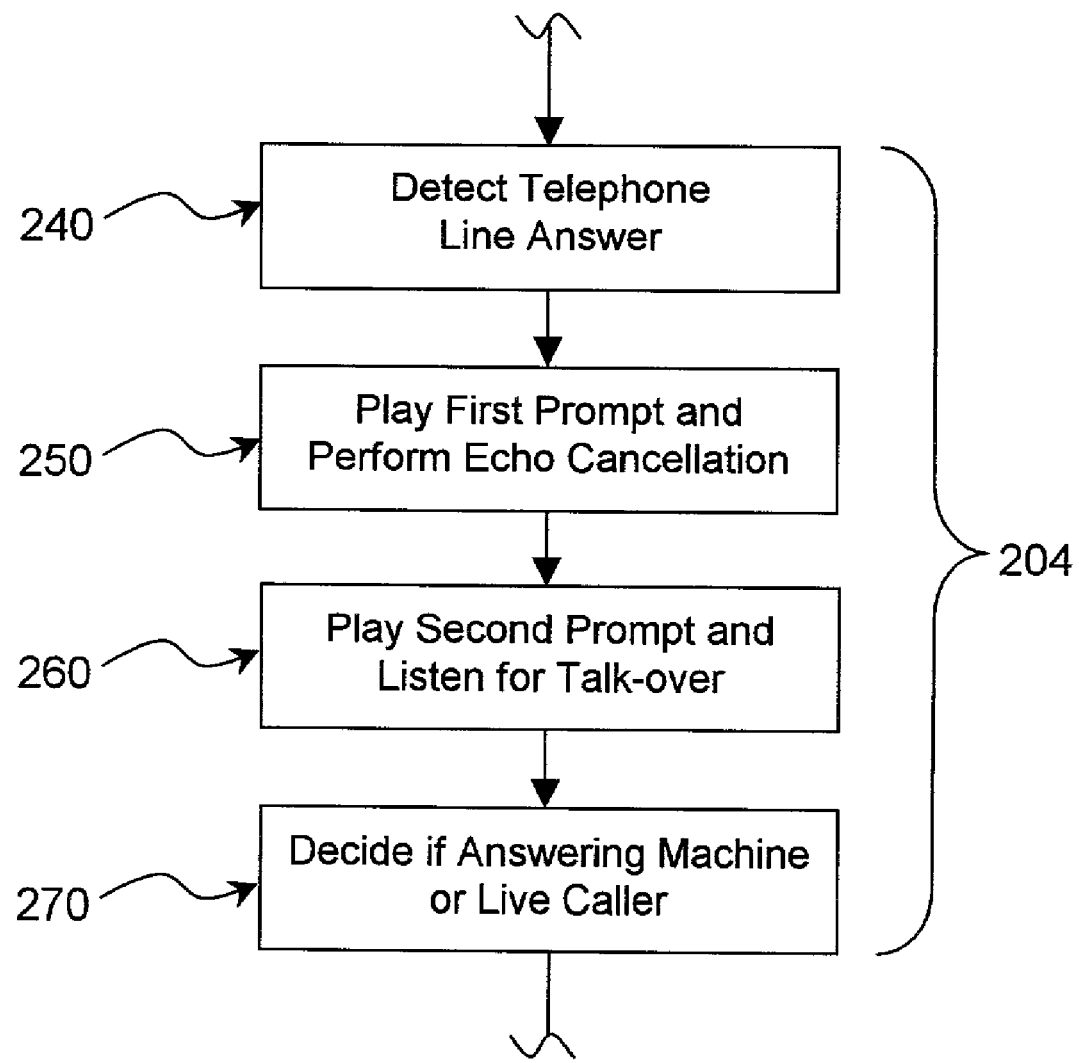
FIG. 4 shows a detailed flow chart illustrating a portion of an answering machine detection operation of the present invention.

FIG. 4 illustrates a preferred method of the present invention for detecting an answering machine at step 204. In this step 204, the TMS 100 detects the telephone line pick-up at step 240 by conventionally known means. The TMS 100 then plays a first prompt (or set of prompts) at step 250 to perform a conventionally-known initialization process called echo cancellation, whereby the TMS 100 listens for the sound of the prompt played at step 250 to determine the delay or latency between when the prompt is played and when the TMS hears the echo of the prompt back over the phone lines. The TMS 100 then completes the echo cancellation step by subsequently using conventionally-known phase canceling to cancel out sounds generated by the TMS 100 for the remainder of the call duration. Preferably, the first prompt that the TMS 100 plays is short and simply says "Hello."

The delay between the line pick-up and the playback of the first prompt by the TMS 100 is preferably between zero and 2 seconds, and is preferably approximately 0.75 seconds so that a live Recipient will not sense an unnatural speed or delay in the start of speech at the front of the call. Additionally or alternatively, the TMS 100 can wait to hear a predetermined amount of voice energy from the Recipient's end of the telephone line before playing the first prompt at step 250, whereby the TMS 100 plays the first prompt at approximately less than 1 second and preferably at approximately 0.25 seconds from detection of the voice energy by the TMS 100. Additionally or alternatively, the TMS 100 may also wait for the end of voice energy on the line to play the first prompt, and will preferably wait approximately 0.25 seconds from detection by the TMS 100 of the end of the voice energy from the telephone line pick-up.

After performing echo cancellation, the TMS 100 plays a second prompt (or set of prompts) at step 260. The second prompt at step 260 preferably contains recorded sounds consisting primarily of human speech that introduces the call, such as: "This is a call from John Smith." During playback of this second prompt, the TMS 100 listens for talk-over. By talk-over is meant speech or voice energy coming from the telephone line of the Recipient that continues for a predetermined amount of time during playback of the second prompt. The presence of talk-over during playback of the second prompt at step 260 indicates the presence of an answering machine because of the difference in the behavior of a live Recipient 160 and an answering machine. Specifically, a live Recipient 160 will typically answer the phone with either a short greeting, such as "Hello" or, if answering with a longer greeting, such as "Hello. Thank you for calling XYZ Company, how may I direct your call?" the live Recipient will interrupt their own speech when they hear the continued playback of the second prompt by the TMS 100. Should an answering machine pick-up the telephone line, on the other hand, the answering machine will typically play its introductory greeting back during the second prompt being played back by the TMS 100 at step 260, which is an example of talk-over. When such talk-over is detected by the TMS 100 during playback of the second prompt by the TMS 100 at step 260, the presence of such talk-over can be used by the TMS 100 to determine at step 270 that the line pick-up was made by an answering machine. The TMS 100 can then branch at step 206 to record the message into the answering machine at step 230, as shown in FIGS. 3 and 5.

It is preferable that the TMS 100 detect talk-over which is greater than a predetermined length of time. Such predetermined length of time for detecting the talk-over is preferably greater than the length of a cough or other typical extraneous background noise that might be heard with a live Recipient 160 on the line. Preferably, the TMS 100 should respond to talk-over that is between 0.5 and 1.5 seconds and preferably approximately 0.8 seconds in length to determine that there is an answering machine present.

This second prompt at step 260 preferably plays immediately after the first prompt at step 250 to speed the process of detecting an answering machine and to detect answering machines that have very short messages. Nevertheless, the second prompt at step 260 does not necessarily need to play immediately after the first prompt at step 260; it can be spaced from the first prompt by silence or another prompt. Preferably, however, there is no silence greater than what is natural to human speech between words contained in the first prompt and words contained in the second prompt. If the first prompt at step 250 contains just the word "Hello," for example, and the second prompt at step 260 contains the words "This is a message from John Smith," an appropriate amount of silence between these two prompts is approximately less than one second and preferably approximately 0.5 seconds. It is desirable that delays during the answering machine detection at step 204 do not sound unnatural, as live Recipients 160 tend to hang-up on calls that have unusual speech patterns or unusual lengths of silence as an indication that they are telemarketing calls initiated for live agents, with the silence created by conventionally known predictive dialers that route calls to telemarketing agents.

Figure 5:
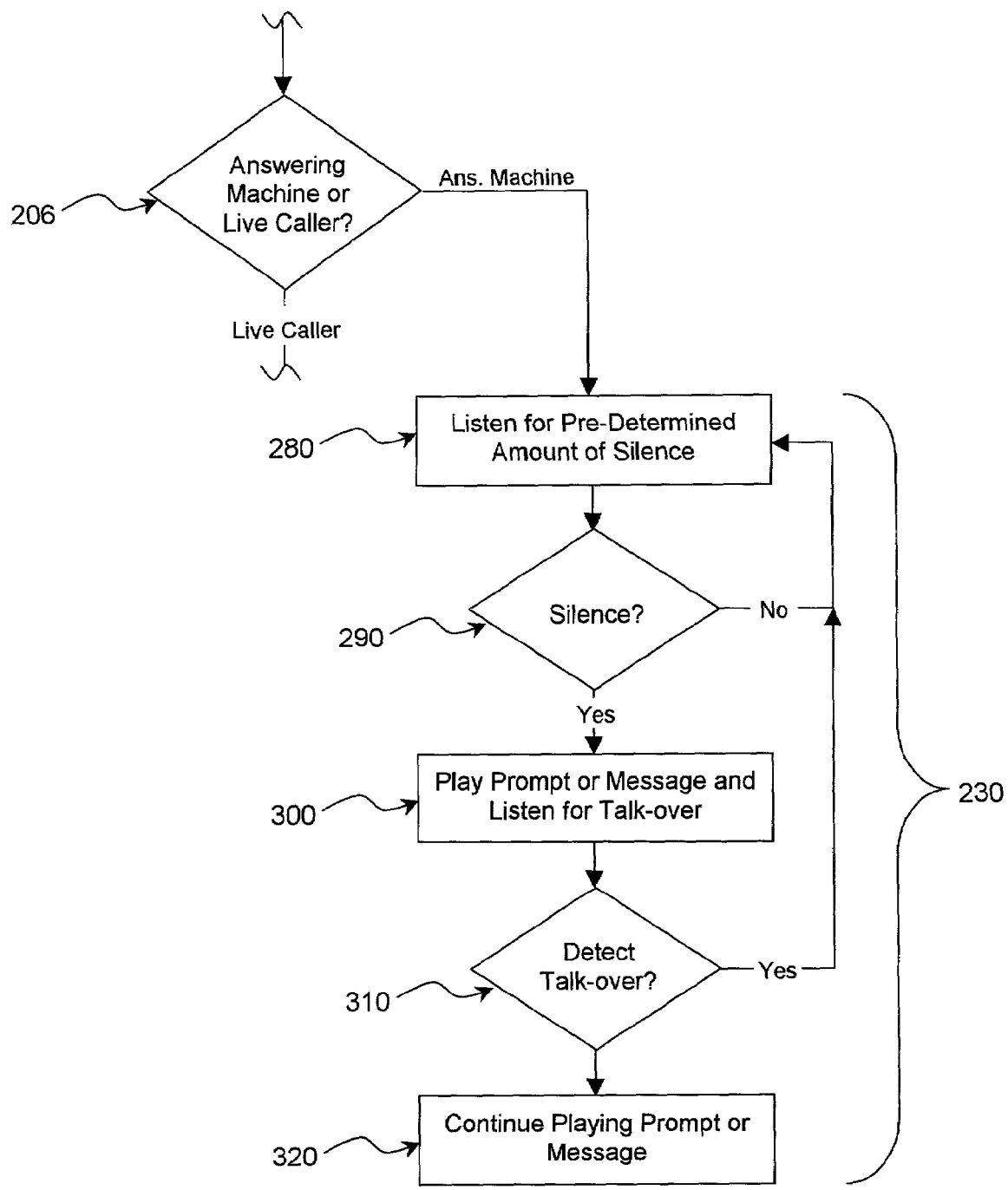
FIG. 5 shows a detailed flow chart illustrating a portion of an answering machine recording operation of the present invention.

FIG. 5 illustrates the preferred method for recording the message on an answering machine at step 230 once the TMS has determined that the telephone line pick-up was by an answering machine. Answering machines typically play a greeting, followed by a beep that signals to callers the start of a recording session. The beeps that answering machines make to signal the start of a recording session often vary significantly in frequency, amplitude and duration, and are therefore difficult to detect in all cases. During the recording session, however, the answering machine is silent to allow the clean recording of the caller's message. One method of detecting the beginning of the recording session according to the present invention is to detect the beep made by the answering machine. In another preferable method of detecting the recording session according to the present invention, the TMS 100 at step 280 listens to the telephone line for a predetermined threshold amount of silence, preferably between 1 to 4 seconds, as an indication that the answering machine is now in the recording session. Once the TMS 100 hears the threshold amount of silence at step 290, the TMS will then begin to play a third prompt or the message at step 300. The third prompt may be a unique prompt, the message or the first and second prompts combined. Because nearly all answering machines are silent during the recording period, this latter method of the TMS 100 detecting silence as an indication that the recording session has begun is superior in accuracy compared to the detection of the answering machine beep.

Some answering machines, however, have greetings or prompts before the start of the recording session that have silence greater than the threshold amount of silence that the TMS 100 detects in the preferred method of detecting the recording session. When the answering machine plays back a silence greater than this threshold amount before the start of the recording session, the TMS 100 may incorrectly begin playing the third prompt or message before the recording session begins on the answering machine. Accordingly, the method of the present invention additionally employs a restart operation in which the TMS 100 listens for talk-over during the playback of the third prompt or message at step 300. Should the TMS 100 detect talk-over during the third prompt or message at step 300, the TMS 100 will either restart playback of the third prompt or message at step 310, or go back to listening for the pre-determined amount of threshold silence at step 280 before restarting playback of the third prompt or message at step 310. In this latter case where the TMS goes back to step 280, once the TMS 100 again hears the predetermined amount of threshold silence at 280 it will then continue through step 290 on to play the third prompt or message at step 300 and listen for talk-over again. Upon detecting talk-over at step 300 and going back to step 280, the TMS 100 can listen for the same predetermined amount of threshold silence, or it can listen for a different amount, such as an amount that is slightly more or slightly less than the predetermined threshold amount of silence than on the previous restart. Preferably, the TMS 100 listens for the same predetermined threshold amount of silence than on the previous restart each time the TMS 100 restarts. In this manner, the TMS 100 will restart playback of the third prompt or the message each time it hears talk-over during the perceived recording session, which indicates that the answering machine was likely not in the recording session.

At a predetermined duration into the call, however, it is desirable to continue playback of the third prompt or message in spite of any talk-over. For example, some answering machines will play a time warning message towards the end of the recording session. To get the maximum amount of recording time possible, it is preferable that the TMS 100 not restart during this time warning message. Accordingly, after a predetermined duration into the call, which preferably should be greater than 5 seconds but less than 5 minutes, the TMS 100 will continue playing the third prompt or message at step 320 in spite of the detection of any talk-over.

The predetermined duration into the call at which the TMS 100 will continue playing the third prompt regardless of any talk-over is preferably a function of whether the TMS 100 detects either an answering machine or a live Recipient 160. When the TMS 100 detects an answering machine, it is preferable to continue listening for talk-over for a longer period of time into the call than when the TMS 100 detects a live Recipient 160. Specifically, when the TMS 100 detects an answering machine, it is preferable to continue listening for talk-over for between approximately 30 seconds and 60 seconds into the call, and preferably for approximately 45 seconds into the call. When the TMS 100 detects a live Recipient 160, however, it is preferable that the TMS 100 listen for talk-over for approximately between 10 seconds and 30 seconds into the call, and preferably for approximately 15 seconds into the call. This is because, in the case of a live Recipient 160 answering the call, there is a chance of the TMS 100 detecting background noise in the environment of the live caller. Such background noise can cause the TMS 100 to mistakenly assume it is hearing talk-over and perform a restart that would be undesirable to a live Recipient.

An alternative form of the invention employs a second prompt that requests a touch-tone digit or specific speech input to continue at step 260 in FIG. 4. For example, the second prompt at step 260 may state: "To accept this message, press or say 1." When the second prompt at step 260 includes a request for a touch-tone digit or specific speech input, the TMS 100 can listen for such a touch-tone or specific speech input (using conventionally-known speech recognition technology, such as provided by Nuance Communications® of Menlo Park, Calif.) to determine at step 270 whether the line pick-up is an answering machine or live caller. This is because a live Recipient 160 likely will enter a touch-tone digit or specific speech input, while an answering machine will not. The request for a touch-tone digit employed in the second prompt at step 260 can repeat one or more times, and preferably repeats three times to give a live Recipient 160 an opportunity to push a touch-tone key. When the TMS 100 receives a touch-tone input in this alternative form of the invention, it will determine at step 206 that there is a live caller on the line and proceed to step 208 and/or step 210. If, on the other hand, the TMS 100 does not receive a touch-tone digit when one was requested in the second prompt at step 260, the TMS 100 will determine at step 206 that there is an answering machine on the telephone line and proceed to step 230, including steps 280–320.

This alternative form of the invention is useful when the message is being delivered to a telephone extension through a private branch exchange (PBX), such as when the Recipient's phone number includes an extension, i.e. 617-555-1212 extension 101. In this case, the TMS 100 places the call, which is initially answered by either a secretary or an auto-attendant. The TMS 100 then plays a prompt (step not shown) that says: "This is a call for extension 101. Please connect this call to extension 101." After this initial prompt, the TMS 100 then preferably plays the dual tone multi-frequency (DTMF) digits comprising the extension number: DTMF-1, DTMF-0 and DTMF-1. The secretary or PBX auto-attendant will then cause the call to be transferred to the proper extension, at which point the TMS 100 can then begin detection of a live Recipient 160 or answering machine at step 204. In the case of delivering through a PBX extension, there is often a longer period of time between the start of the call and the time at which the TMS 100 detects either a Recipient or an answering machine. As such, the predetermined duration into the call at which the TMS 100 will continue playing the third prompt at step 320 is preferably longer than when the TMS 100 is delivering a message to a phone number that doesn't have an extension or need to be transferred through a secretary or auto-attendant. When the TMS 100 is delivering a message to a phone number that has an extension or that must otherwise be directed through a secretary or auto-attendant, it is preferable that the TMS 100 listen for talk-over for approximately between 10 seconds and 5 minutes into the call, and preferably for approximately 1 minute into the call (from line pick-up) or after the transfer to the extension by the secretary or auto-attendant. In this manner, the present invention can operate to detect an answering machine or live Recipient 160 in calls to phone numbers that have extensions or must otherwise be transferred to another line.

As to a further discussion of the manner of usage and operation of the present invention, the same should be apparent from the above description. Accordingly, no further discussion relating to the manner of usage and operation will be provided.

While the present invention has been described as utilizing the telephone system to connect the Sender and Recipient with the TMS 100, the invention may also utilize any other communications medium now known or later developed outside of the public telephone network and systems. For example, the Sender and Recipient could either or both be connected to the TMS 100 by wireless devices, Internet connections, or other communication means, to enable the sending and receiving of audio and/or video messages. Furthermore, while the present invention has been described as including an echo cancellation step, this step is not necessarily required and is described merely as a way of initializing conventionally-known telephony systems (such as those provided by Natural Microsystems® and Nuance Communications®) that operate to detect speech and voice energy over telephone lines. It is possible to enable the present invention without this echo cancellation step in telephony systems that do not need to remove the echo to operate as described herein.

With respect to the above description then, it is to be realized that the optimum dimensional relationships for the parts of the invention, to include variations in form, function and manner of operation, implementation and use, are deemed readily apparent and obvious to one skilled in the art, and all equivalent relationships to those described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An answering machine detection method for a voice message delivery system, comprising:
   (a) placing an outbound call to a telephone line of a Recipient;
   (b) detecting a telephone line pick-up;
   (c) performing echo cancellation on the outbound call;
   (d) playing a prompt to introduce the outbound call to a live Recipient, wherein the prompt is selected from the group consisting of "This is a message from [Sender's name]," "This is a call from [Sender's name]," and "[Sender's name] has sent you a message,"; and
   (e) determining, at a voice message sewer, that the telephone line pick-up was by an existing answering machine when talk-over occurs at the same time as at least a portion of the playing of the prompt, the talk-over comprising voice energy coming from the telephone line of the Recipient.

2. The answering machine detection method of claim 1 further comprising:
   (f) waiting for silence when the telephone line pick-up was by the existing answering machine;
   (g) playing a first message when the telephone line pick-up was by the existing answering machine; and
   (h) playing a second message when the telephone line pick-up was by a live Recipient.

3. The answering machine detection method of claim 2 further comprising:
   (i) detecting talk-over by the existing answering machine during the playing of the first message; and
   (j) restarting the playing of the first message.

4. The answering machine detection method of claim 2, wherein the first message is different from the second message.

5. The answering machine detection method of claim 2 further comprising:
   (k) playing at least one interactive option when the telephone line pick-up was by the live Recipient.

6. The answering machine detection method of claim 5 further comprising:
   (l) playing at least one interactive reject option when the telephone line pick-up was by the live Recipient.

7. The answering machine detection method of claim 1, wherein the playing of the prompt occurs within one second of detecting the telephone line pick-up.

8. The answering machine detection method of claim 1 further comprising detecting voice energy after detecting the telephone line pick-up, and wherein the playing of the prompt occurs within one second of detecting the voice energy.

9. The answering machine detection method of claim 1 further comprising detecting voice energy and an end of that voice energy after detecting the telephone line pick-up, and wherein the playing of the prompt occurs within one second of detecting the end of the voice energy.

* * * * *